May 5, 1959 — E. L. TRIMAN — 2,885,637
CONTINUOUS ELECTRONIC ETCH DEPTH INDICATOR
Filed Oct. 18, 1955 — 3 Sheets-Sheet 1

INVENTOR.
EUGENE L. TRIMAN
BY
*William R. Lare*
ATTORNEY

May 5, 1959  E. L. TRIMAN  2,885,637
CONTINUOUS ELECTRONIC ETCH DEPTH INDICATOR
Filed Oct. 18, 1955  3 Sheets-Sheet 2

INVENTOR.
EUGENE L. TRIMAN
BY
ATTORNEY

United States Patent Office

2,885,637
Patented May 5, 1959

2,885,637

CONTINUOUS ELECTRONIC ETCH DEPTH INDICATOR

Eugene L. Triman, Whittier, Calif., assignor to North American Aviation, Inc.

Application October 18, 1955, Serial No. 541,136

3 Claims. (Cl. 324—65)

The present invention is directed to various forms of apparatus and a method of continuously indicating etching depth. More particularly, this invention concerns apparatus and a method for providing a continuous indication of the depth of etching of a metal workpiece.

Heretofore, control of etching processes has been accomplished by providing a timer which allows etching to continue for a predetermined period. This timer, however, gives no indication how fast etching is progressing nor does it compensate for changes in etchant concentration, temperature, pH, or other variables affecting the etching rate of the etchant. Another alternative procedure to find out how much a workpiece has been etched is to periodically remove either the workpiece or a sample from the etching medium and physically measure the depth etched. This technique, however, is undesirable for the reason that removal of a workpiece from the etchant is not practical and the interruption of the sample or workpiece from the etching creates an inherent error.

The present invention provides a measuring apparatus and method entailing the use of a fuse link which is placed within the etchant medium and exposed to the same etching action as the workpiece. An electrical sense is made continuously of the voltage across the sample and of the resistance therein during the diminishing of the cross-sectional area due to etching. The voltage drop is indicated on a meter calibrated to read etching depth directly. Modifications of the basic indicator are disclosed and claimed herein which gives optimum performance.

Due to the fact that the etchant fluid is normally a conductive medium which will obscure resistance readings of a sample placed therein, the present invention, in addition, contemplates applying a relatively high instantaneous current (1–10,000 amps.) and low voltage (0.001–10.0 volts) to the sample in order to accentuate differences in the low resistance of the relatively large sample. Suitable amplification of the signals showing changes in electrical parameters occurring across the sample during etching may also be provided.

An object of this invention is to provide an etching depth indicator.

A further object of this invention is to provide a means to give a continuous reading of etching depth.

A still further object of this invention is to provide an electrical means for sensing etching depth.

An additional object of this invention is to provide an electrical means for monitoring a metal etching process.

Another object of this invention is to provide means in a voltage drop measuring device for decreasing the resistance effect of lead-in connectors.

A further object of this invention is to provide means for determining operating etching rates in etching baths.

A still further object of this invention is to provide means for determining limiting periods of workpiece etching.

An additional object of this invention is to provide a method of continuously measuring etching depth.

Other objects of invention will become apparent from the following description taken in connection with the accompanying drawings, in which.

Figure 1:
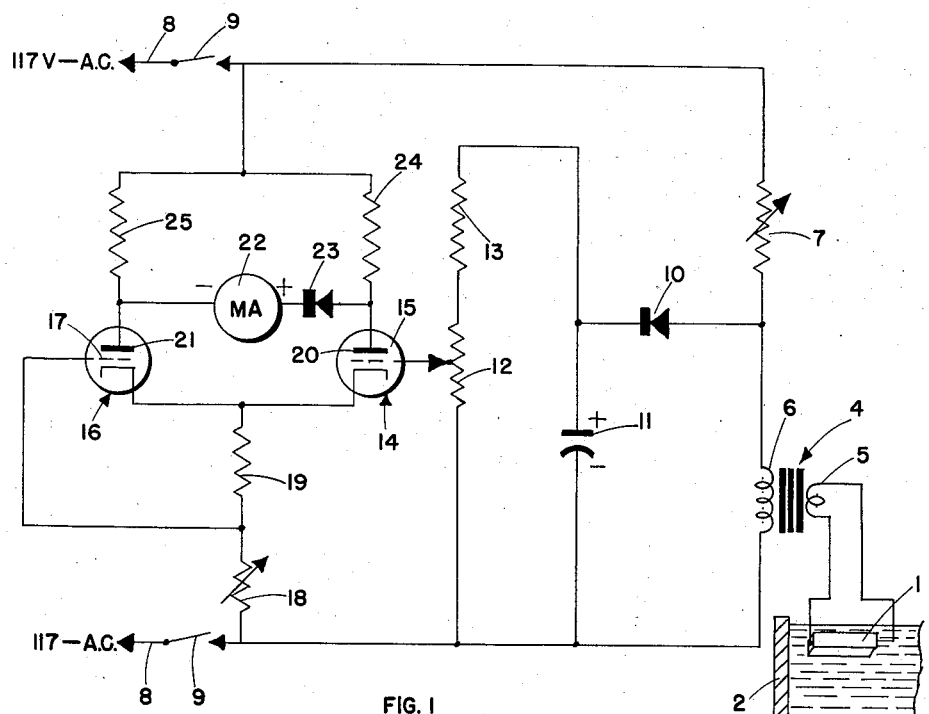
Fig. 1 is an etching depth indicator for alternating current operation.

As seen in Fig. 1, a metal sample 1 of the same material that is being etched within the tank 2 is placed within the etching fluid 3 and is attacked at the same rate as the workpieces which are present in the tank. The initial sample 1 is connected in shunt across the secondary winding 5 of a transformer 4 to produce a low reflected impedance in the primary winding 6. The winding 6 is connected in series with the A.-C. supply 8 through switch 9 and limiting resistor 7, the latter chosen in value so that only a small residual voltage appears across the primary windings due to the shunting action of the sample. A rectifier 10 is provided to charge a capacitor 11 to a resultant D.-C. voltage which is applied to the voltage divider resistor 12 and current limiting resistor 13 effective if the device is operated without a sample in place. A portion of the voltage across resistor 12 is applied to the grid 15 of a triode 14, reducing its negative bias with respect to the cathode. A triode 16 is provided having a low bias voltage on its grid 17 and conducts current easily causing its anode 21 to be at a low potential whenever the A.-C. supply voltage applied to the anode is positive with respect to the cathode. Triode 14 has a more negative bias and its anode 20 is more positive with respect to the cathode. On alternating half-cycles, neither tube conducts. The effect is that a pulsating direct voltage appears between the anodes of triodes 14 and 16 due to the rectification action and the fact that the anode circuits are unbalanced. A microammeter 22, responding to the unidirectional current flow between anodes 20 and 21, deflects proportional to the unbalance which is at a maximum under initial conditions with a full size metal sample. As the sample is reduced in size in the etching bath, its resistance increases inversely proportional to its thickness reflecting a higher and higher impedance across a winding 6. The voltage across winding 6 increases so that the resultant D.-C. voltage across the capacitor 11 causes a lower negative bias to appear on the grid 15 of triode 14. The decrease in bias causes a heavier current to flow through the anode circuit of triode 14 proportionate to the decrease in metal sample thickness. The microammeter is calibrated in etch depth, as mentioned, and a minimum metal sample cross-section produces balance of the anode potentials of triodes 14 and 16 for zero meter deflection. Coarse control of the bias on grids 17 and 15 is effected by adjustment of the variable grid resistor 18. Suitable cathode and plate resistors 19, 24 and 25 are provided. A rectifier 23 may be provided in series with the microammeter to protect the meter from reverse current flow when an accidental discontinuity in the sample connection occurs.

Figure 2:
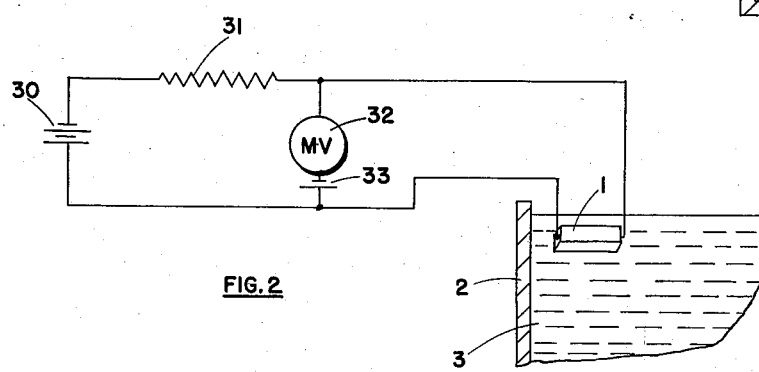
Fig. 2 is a simplified form of the invention.

Fig. 2 shows a simplified form of the etching depth indicator. This modification includes a source of electric current 30, a current limiting resistor 31 in series therewith, a sample 1 of the metal to be etched having predetermined dimensions, and a millivoltmeter 32 calibrated in thickness. Using the known relation of electrical resistance to physical size of the conductor, the resistance of a uniform cross-section of the sample varies inversely proportional to the cross-sectional area. Consequently, in the circuit shown in Fig. 2, the voltage across the terminals of the sample 1 will vary inversely as the cross-sectional area of thickness. When a sample is cut to predetermined dimensions, the cross-sectional value thereof will produce a predetermined voltage drop. This voltage is measured continuously by the millivoltmeter so that the meter movement deflection is calibrated in terms of etched depth. When the sample is immersed in an etching bath, the reduction in cross-section will produce discrete increases in meter pointed deflection to correspond to the instantaneous thickness. Range of thickness change can be set so that the bath conductivity, in parallel with the sample conductance, does not cause excessive error in reading. Since the circuit shown in Fig. 2 is limited by the fact that a residual voltage is present at maximum thickness to restrict the useful deflection range of the voltmeter, a bucking voltage source 33 may be introduced to balance out the initial meter reading so that full scale deflection can be used.

Figure 3:
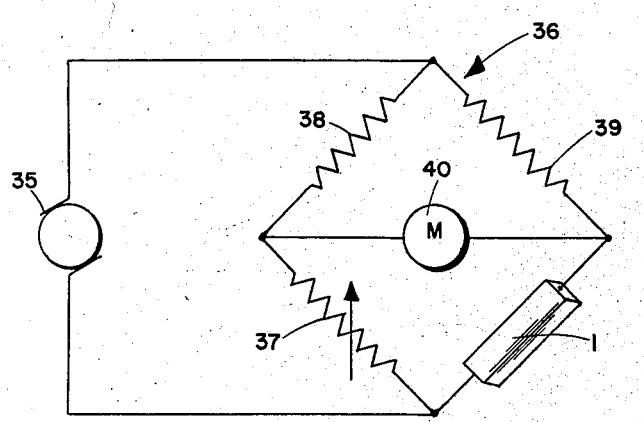
Fig. 3 is an etching depth indicator using a bridge circuit.

Fig. 3 shows the principles of this invention incorporated in a bridge-type circuit. In Fig. 3, an alternator 35 is provided to provide a source of alternating current. A bridge including a variable resistor 37 and fixed resistors 38 and 39 is provided with sample 1, which is immersed in the etchant fluid as one leg of the bridge. The null balance meter 40 (e.g., a microvoltmeter for A.-C. operation) is provided across the bridge. In operation, the bridge is balanced by the manipulation of variable resistor 37 at the time the full sample is placed in the etchant tank and etching commences. As the cross-sectional area of the sample 1 decreases due to the change in dimensions caused by the etching, the pointer of meter 40, calibrated directly in etching depth, will deflect according to the resultant voltage drop caused by such dimensional change. While a "Wheatstone type of bridge circuit is shown, a Kelvin bridge or other standard bridge configuration is usable to minimize lead resistance errors.

Figure 4:
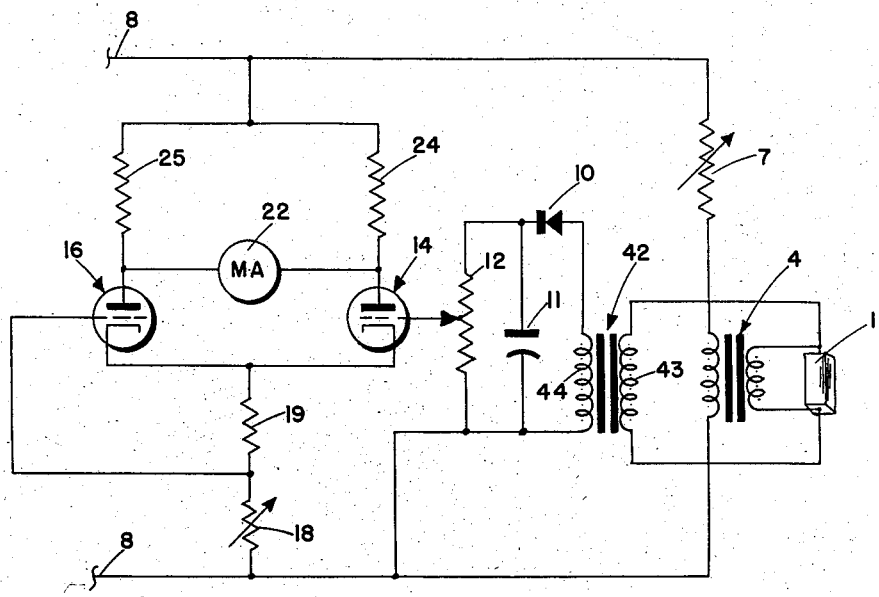
Fig. 4 is a modification of the circuit seen in Fig. 1.

Fig. 4 is a modification of the circuit seen in Fig. 1 in which a transformer 42 acts to detect the voltage across the sample 1 independently of the current means 4 which produces the voltage drop across the sample. The voltage drop of sample 1 is effective across the secondary 43 of the transformer 42 and causes a voltage to be induced in primary 44 which operates on the rectifier-capacitor combination 10 and 11 as described with respect to Fig. 1. By the use of a high impedance transformer 42, the undesirable effect of the resistance of the leads carrying the test current to the metal sample through the transformer 4 is minimized.

Figure 5:
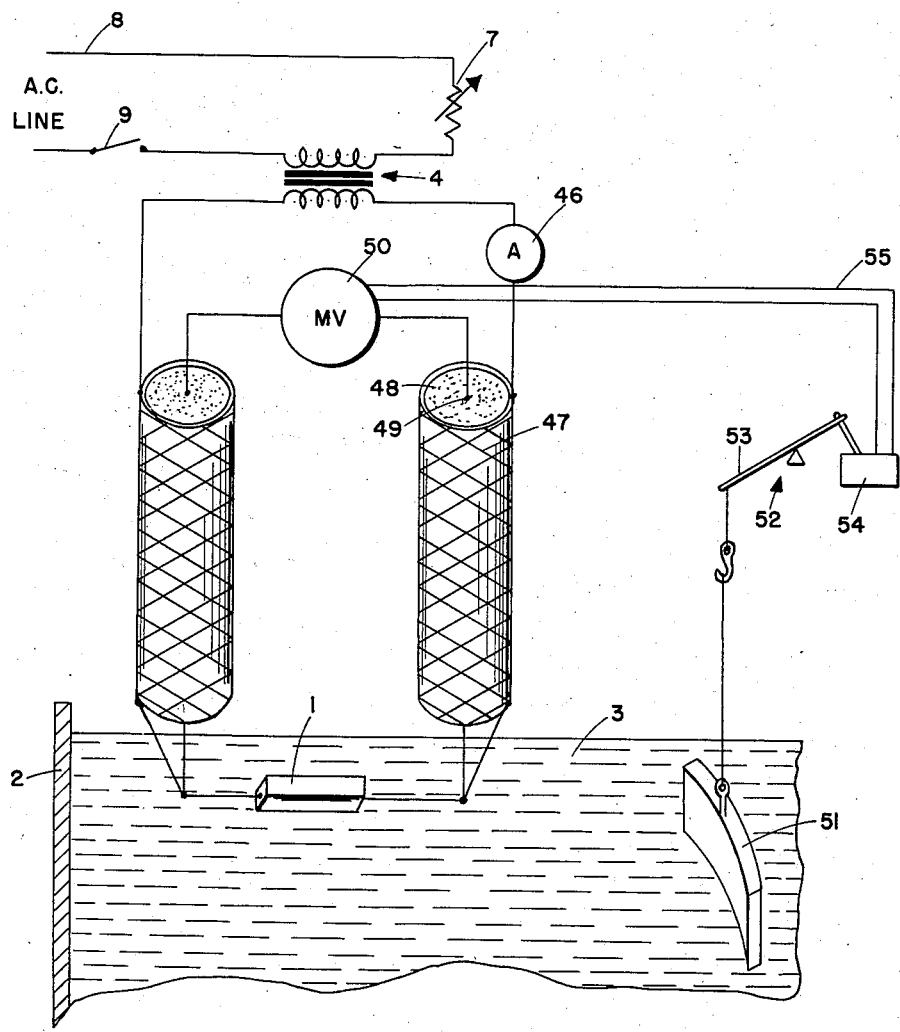
Fig. 5 is an overall view of a simplified modification of the indicator.

In Fig. 5, a configuration and circuit is shown which also minimizes errors introduced by the resistance of the connecting leads. The supply current passes through variable resistor 7 and the primary of transformer 4 so that an induced current flows through the transformer secondary and the sample 1 within the etching fluid. This test current is passed through an outer conductive heavy metal braid 47 having low resistance. An inner conductor 49, spaced from the heavy braid 47 by insulation 48, affords sensing of the voltage drop across the sample. A high resistance millivoltmeter 50, across the conductor 49, is provided to measure the potential across the sample length. In this case, resistance measurement of the sample is by the voltmeter-ammeter method which uses both current and voltage readings in computing resistance by Ohm's law. The resistance in ohms is obtained by dividing the voltage by the measured current. However, for depth indication, the voltmeter is calibrated in thickness units correlated to the variations in voltage that occur as the sample increases in resistance due to etching. The ammeter 46 is read only at the time that the current is initially set standard by means of the calibration rheostat.

The meter 50, shown in Fig. 5, along with the other indicating meters shown in Figs. 1 to 4, may be provided with contacts on the meter pointers for closing an electric circuit at a manually preset deflection point on the meter scale. This affords means for manually presetting a warning circuit to operate when a given etched depth is reached for limit purposes. Such limit sensing means may make or break a circuit through leads 55 to a control 54 to operate a removal means 52, including typically a lever arm 53, to hoist a workpiece 51 from the tank 2.

Such a limiting etching depth device is advantageous since it permits the use of a metal sample having one set of fixed dimensions to be used for a multiple of limit operations by simple manipulation of a dial pointer on the meter for each desired etched depth. Thus, a single size of metal sample may be mass-produced for use as a standard for an entire range of depths without special dimensioning. Relationship of the sample to the actual thickness of the workpiece being etched is not required because the instrument is calibrated in etched depth for the particular metal.

Due to the fact that the etching bath will be conductive and such bath conductivity will be in parallel with the sample conductance, it is necessary to have the sample of such a predetermined dimension as to minimize the bath conductivity effect. This can normally be done by limiting the use of the sample to a thickness minimum that produces conductance at least ten times that of the bath.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An etching depth indicator comprising in combination with a tank containing an etchant solution; a primary electrical detector circuit, a secondary electrical circuit inductively coupled thereto, a metal sample of predetermined thickness in shunt across said secondary circuit and adapted to be exposed to etching action in said solution, a meter calibrated in etching depth shunt-mounted in said primary circuit, a transformer connected inductively to said metal sample to supply current flow therethrough and means in said primary circuit responsive to changes in thickness of said sample as dictated by changes in current flow therethrough to indicate the etched depth of said sample on said meter.

2. The invention as set out in claim 1 in which means are provided to sense the attainment of a predetermined etching depth as dictated by meter scale deflection.

3. The invention as set out in claim 1 in which said last-mentioned means includes a rectifier in series with said primary circuit, a capacitor in parallel with said rectifier and said primary circuit, a first triode connected across said supply current and having a low bias voltage on the grid, a second triode connected across said supply and having the grid thereof connected across said capacitor to give a bias more negative than on said first triode grid, and in which said meter is connected across the anodes of said first and second triodes whereby changes in unbalance of said anodes due to a decreased cross-sectional area in said sample and increased impedance in said primary circuit are reflected on said meter in terms of depth of etch.

References Cited in the file of this patent

UNITED STATES PATENTS

| 2,088,843 | Davies | Aug. 3, 1937 |
| 2,552,088 | Davis | May 8, 1951 |
| 2,735,754 | Dravnieks | Feb. 21, 1956 |
| 2,757,334 | Potter | July 31, 1956 |